May 16, 1944. O. S. FLATH 2,348,968
CONDUCTOR AND TRACK WIRE CONNECTION HOLDING MEANS
Filed Oct. 17, 1941
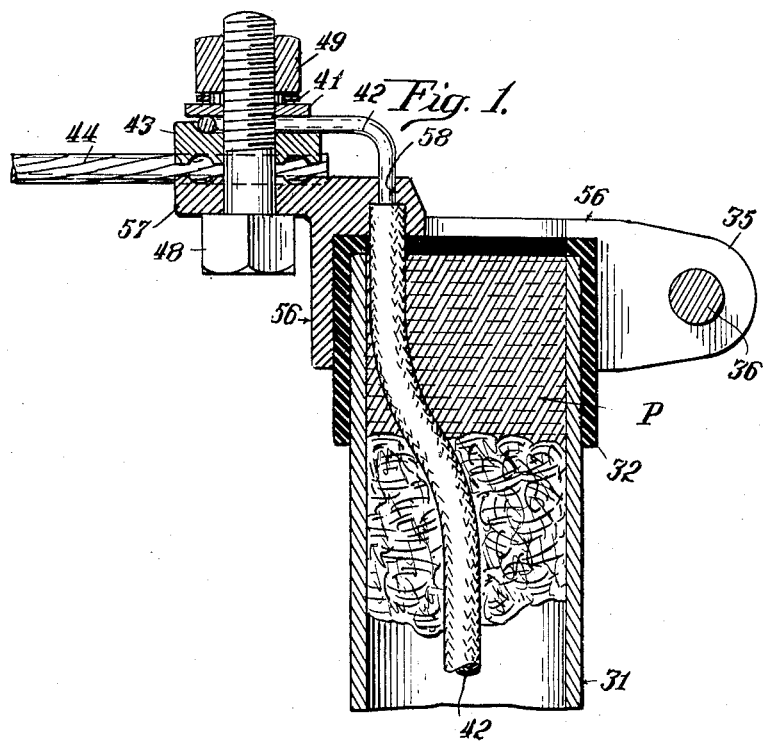
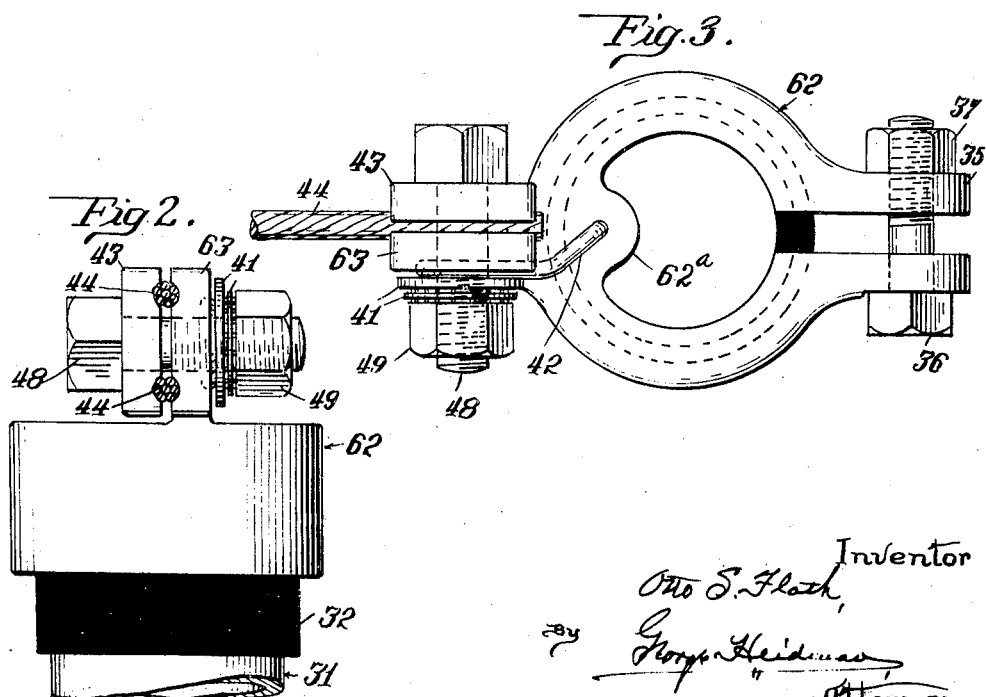
Inventor
Otto S. Flath,
By George Heidman
Attorney.

Patented May 16, 1944

2,348,968

UNITED STATES PATENT OFFICE 2,348,968

CONDUCTOR AND TRACK WIRE CONNECTION HOLDING MEANS

Otto S. Flath, Chicago, Ill.

Application October 17, 1941, Serial No. 415,388

2 Claims. (Cl. 174—75)

My invention relates to means adapted to be secured to the top of the usual vertically disposed standard or conduit through which the current conducting conductors or cables are brought upwardly to the surface so that electrical relation with the track wires in a signal system may be effected through the medium of suitable wire holding and conductor elements which are to be firmly secured to the upper open end of the standard or conduit and the electrical relation maintained under the adverse conditions encountered while permitting installation and maintenance to be readily accomplished; the invention involving means which will adapt itself to various designs of track wire clamping or holding means.

The objects and advantages of my invention will be readily comprehended from the following detailed description of the accompanying drawing wherein:

Figure 1 is a sectional view of the upper end of a conduit and of my improved clamping sleeve and wire holding means.

Figure 2 is a side elevation of a modification, illustrating a vertical method of wire clamping means.

Figure 3 is a top plan view of Figure 2.

The invention relates to clamping sleeves for attachment to the upper end of the cable wire standards or conduits whereby the wire clamping elements or electrical connection forming means are removably and firmly secured to the upper ends of the conduits, with a portion of the wire clamping elements made integral with the sleeves; the sleeves being formed to permit complete contraction about the upper ends of the conduits.

The invention, as exemplified in Figure 1, comprises a split sleeve 56 of suitable vertical width and normally adapted to loosely receive the upper open end of the vertical conduit or tubular stand 31 and preferably a fibre or insulating collar 32 shown with an inturned flange at the top to overlap the upper end of the conduit 31, in order that the sleeve 56 may be insulated from the conduit. The top of the sleeve is provided with an annular inturned flange adapted to overlap the upper perimeter of the conduit 31; and the sleeve is vertically split at one side from top to bottom and provided on each side of the split with the outwardly disposed lobes 35, apertured at their outer ends to receive the horizontally disposed bolt 36 provided with a nut 37, the screwing up of which will cause the lobes 35 to be drawn together and the sleeve with its flange to be completely contracted about the standard or conduit 31.

The top of the sleeve opposite to the split portion, is provided with an integral, laterally extending lug 57 which is apertured to receive the vertically disposed bolt 48 whereby the conducting plate or element 43, and washers 41 are secured in place when nut 49 is screwed on the bolt 48; the opposing faces of elements 43 and lug 57 having correlated grooves to receive the track wires 44, 44; while the upper face of element 43 is also preferably recessed to receive the unsheathed end of the cable or conductor wire 42. The flange of the sleeve coincident with the lug 57 has an enlarged portion provided with a vertically disposed opening at 58 for passage of the conductor wire 42, with the lower end of the opening 58 counterbored or enlarged to snugly receive the sheathed end of the conductor wire. The sleeve is preferably insulated from the conduit 31 by insulating sleeve 32; the sleeve constituting a wire holding and conduit clamping unit which eliminates the use of a separate wire holding top plate. The upper end of the conduit is preferably filled with a suitable plastic compound as shown at P to prevent ingress of moisture.

Figures 2 and 3 show a modification of the form shown in Figure 1; the split sleeve 62, opposite the lobes or ears 35 being provided with an upstanding lug 63 horizontally apertured to receive bolt 48 whereby conducting element 43 and washers 41 are clamped in place when nut 49 is screwed up on the bolt 48; the opposing faces of element 43 and upstanding lug 63 being grooved to receive the track wires 44, 44 and the opposite face of element 43 recessed to receive the unsheathed end of the conductor 42 which extends through an aperture in the inwardly enlarged portion 62ª of the sleeve unit 62 which is similar to that shown in Figure 1. The sleeve 62, similar to sleeve 56 in Figure 1, constitutes a wire holding and clamping unit which eliminates the use of separate wire holding members and hence provides a simpler and less expensive installation.

What I claim is:

1. In wire holding means of the character described, the combination of a conductor cable receiving cylindrical upstanding conduit; a contractible sleeve provided at its top with an inturned flange extending circumferentially thereabout adapted to engage the upper end of the conduit without restricting the conduit orifice, said sleeve being split at one side from top to bottom and provided with a pair of parallelly arranged bolt receiving ears, the upper end of the sleeve diametrically opposite the split being enlarged and provided with an outwardly disposed lug, said enlarged portion extending partly inward at one side of the conduit and provided with an aperture adapted to receive the insulated end of a conductor cable, while the outer end of said lateral lug has a bolt-receiving opening and track wire receiving recesses on opposite sides of the bolt-opening; a bolt disposed through said opening; a current conducting centrally apertured plate through which said bolt extends, the plate having wire receiving recesses matching the recesses on said lateral lug for receiving the ends of a pair of track wires while the unsheathed end of the cable wire is disposed about said bolt; and means cooperating with said bolt whereby said plate, cable wire and track wires are clamped to said lug.

2. In wire holding means of the character described, the combination of a conductor cable receiving upstanding conduit; a contractible sleeve provided at its top with an inturned flange, extending circumferentially entirely thereabout, adapted to overlap the upper end of the conduit without restricting the conduit orifice, said sleeve being split at one side from top to bottom and provided with a pair of parallelly arranged bolt receiving ears, the upper end of the sleeve diametrically opposite the split being provided with an outwardly disposed lug and an enlarged portion extending partly inward at one side of the conduit and provided with an aperture to receive the end of a conductor cable, while said lateral lug has a bolt-receiving opening; a bolt disposed through said opening; an apertured plate through which said bolt extends, the plate being adapted to clamp the track wires to said lug, while the unsheathed end of the cable wire is disposed about said bolt; and means cooperating with said bolt whereby the plate, cable wire and track wires are clamped to said lug.

OTTO S. FLATH.